United States Patent [19]

Roberts et al.

[11] 4,065,046
[45] Dec. 27, 1977

[54] METHOD OF MAKING PASSAGE STRUCTURES

[75] Inventors: John A. Roberts, North Chelmsford; Peter R. Roberts, Groton, both of Mass.

[73] Assignee: Brunswick Corporation, Skokie, Ill.

[21] Appl. No.: 533,032

[22] Filed: Dec. 16, 1974

Related U.S. Application Data

[60] Division of Ser. No. 333,112, Feb. 16, 1973, Pat. No. 3,868,792, which is a division of Ser. No. 3,931, Jan. 19, 1970, Pat. No. 3,737,367, which is a division of Ser. No. 778,679, Nov. 25, 1968, Pat. No. 3,506,885, which is a continuation-in-part of Ser. No. 471,123, July 12, 1965, abandoned.

[51] Int. Cl.² .......................... B23P 17/00; B32B 3/10
[52] U.S. Cl. ................................ 228/156; 29/419 R; 148/4; 156/155; 156/168; 156/250; 156/264; 156/296; 156/656; 228/181; 228/193; 264/145; 264/174
[58] Field of Search ............... 156/85, 51, 155, 161, 156/168, 229, 242, 250, 264, 296, 18; 264/145, 149, 174, 250, 290 R, 301, 334; 65/4 B; 148/4; 29/183.5, 191, 163.5 R, 163.5 F, 423, 419 R, 469; 228/156, 190, 181, 193

[56] References Cited

U.S. PATENT DOCUMENTS

| | | | |
|---|---|---|---|
| 1,995,356 | 3/1935 | Legg | 156/51 |
| 2,499,977 | 3/1950 | Scott | 156/155 |
| 2,619,438 | 11/1952 | Varian et al. | 148/4 |
| 2,628,417 | 2/1953 | Peyches | 29/423 |
| 3,224,851 | 12/1965 | Hicks, Jr. | 156/296 |
| 3,275,428 | 9/1966 | Siegmund | 65/4 B |
| 3,277,564 | 10/1966 | Webber et al. | 29/423 |
| 3,291,870 | 12/1966 | Allison | 29/191 |

*Primary Examiner*—William A. Powell
*Assistant Examiner*—M. G. Wityshyn
*Attorney, Agent, or Firm*—John G. Heimovics; William G. Lawler, Jr.

[57] ABSTRACT

A collimated hole structure formed by constricting a plurality of tubular elements each provided with a core for supporting the tubular element during the constricting operation. The bundle of elements is constricted to a point where the elements effectively fuse into a substantially monolithic body. The cores are then removed, leaving a plurality of extremely small diameter, generally parallel passages in a solid body. The tubular elements may be arranged in any desired array, and thus the passages may be provided similarly in any desired array. The passages may have high aspect ratios and may be closely juxtaposed. In one illustrative application, the collimated hole structure is provided with dielectric film and utilized as an anode portion of an electrolytic capacitor. In another illustrative application, the collimated hole structure is utilized as a tip for a drilling device.

14 Claims, 18 Drawing Figures

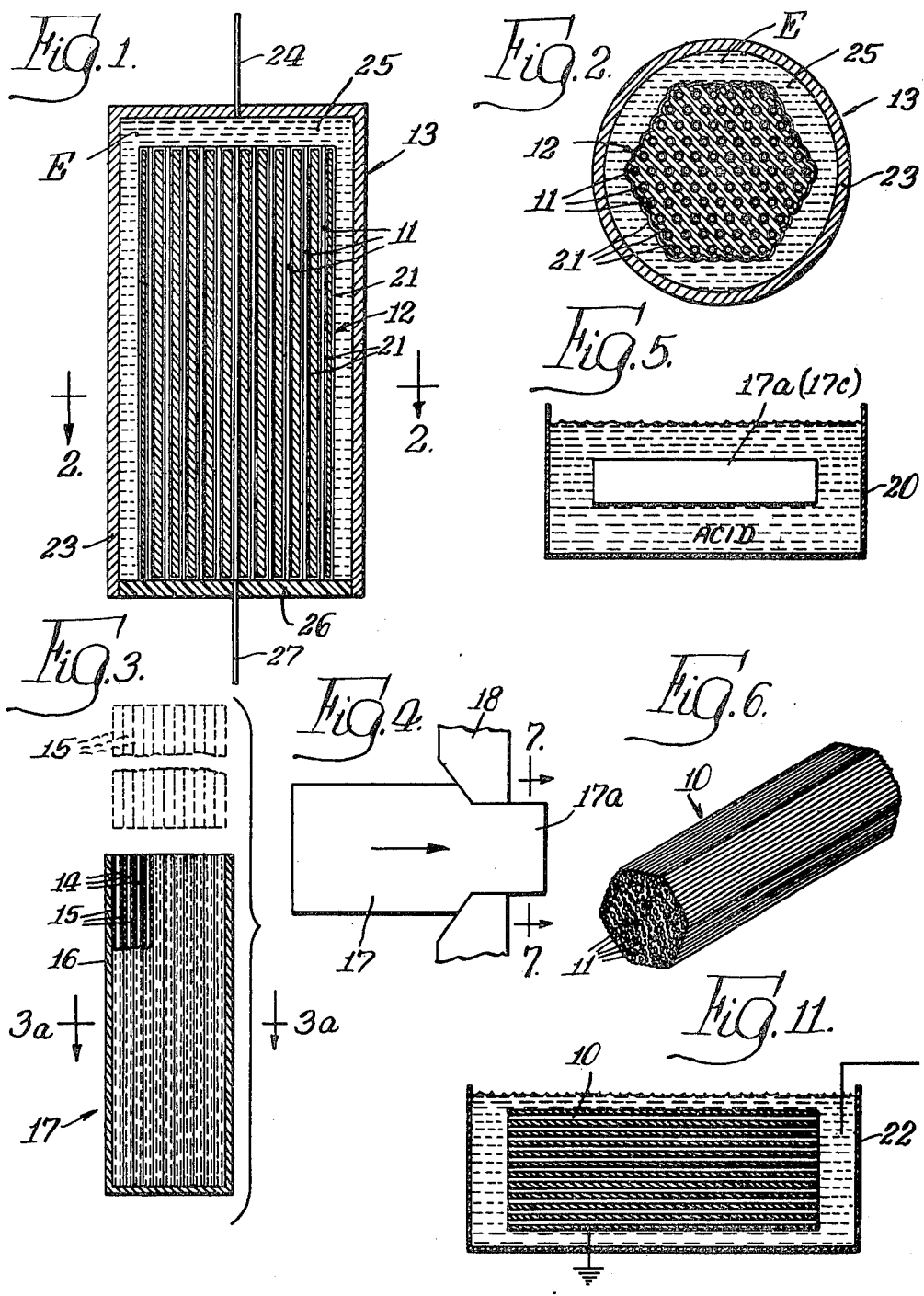

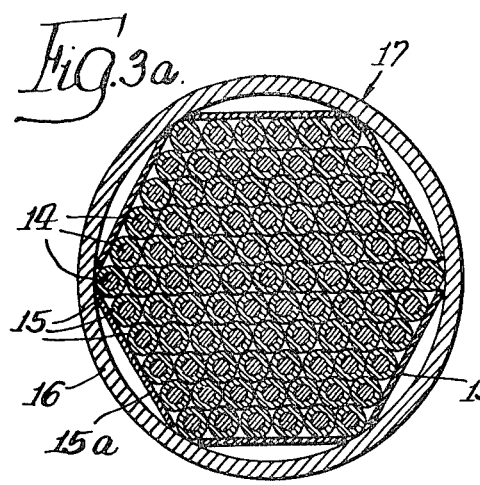
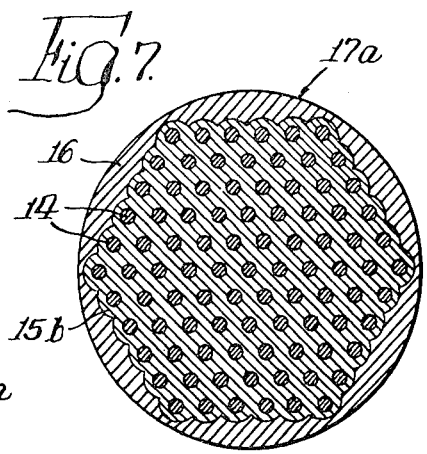
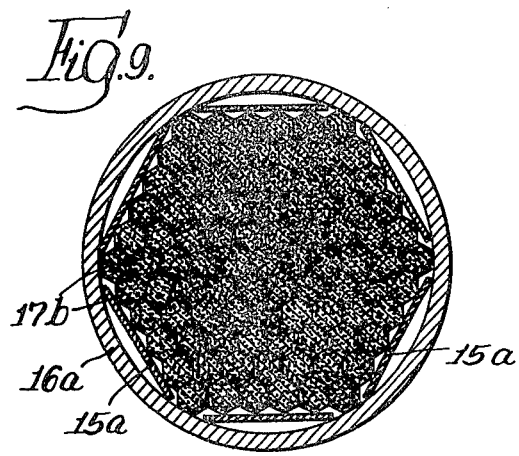
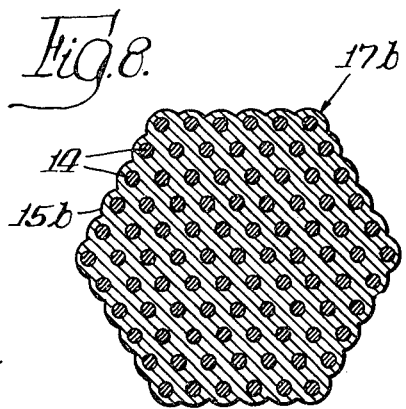
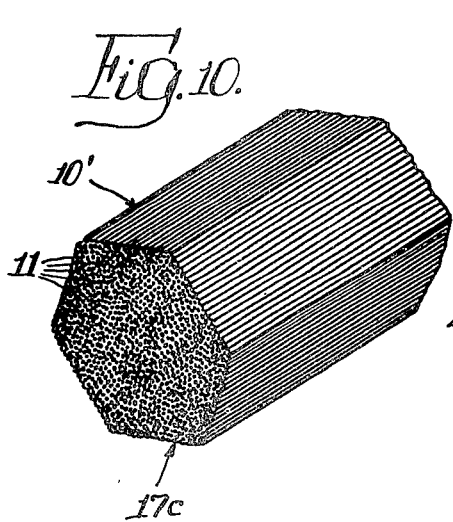
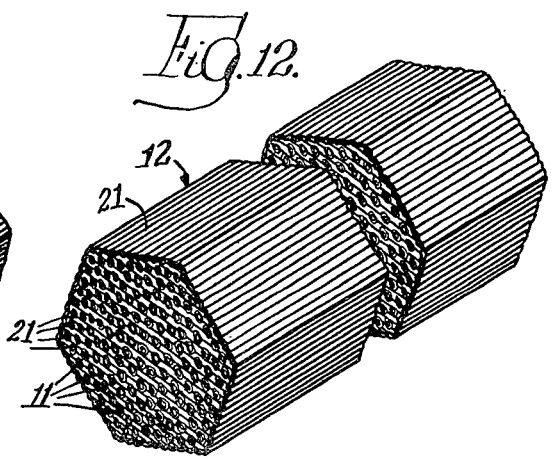

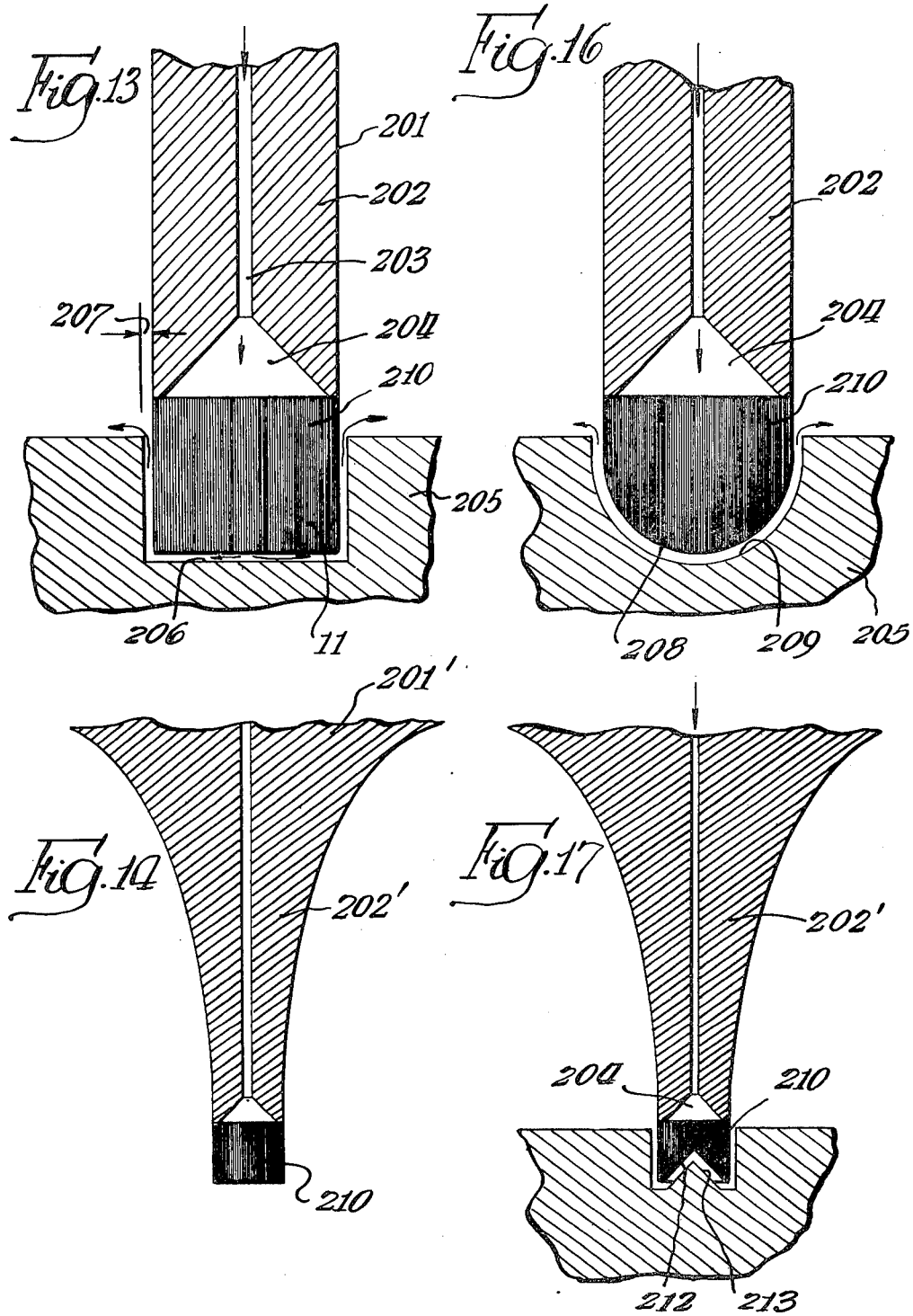

METHOD OF MAKING PASSAGE STRUCTURES

CROSS REFERENCE TO RELATED APPLICATION

This application is a divisional application of our co-pending application Ser. No. 333,112, filed Feb. 16, 1973, now U.S. Pat. No. 3,868,792 which was a divisional application of our co-pending application Ser. No. 3,931, filed Jan. 19, 1970, now U.S. Pat. No. 3,737,367 which was a divisional application of Ser. No. 778,679 now U.S. Pat. No. 3,506,885, filed Nov. 25, 1968, which in turn was a continuation-in-part application of Ser. No. 471,123, filed July 12, 1965, now abandoned.

BACKGROUND OF THE INVENTION

In certain devices, such as electrolytic capacitors, it is desirable to provide elements having effectively maximum surface area for a given mass of material. In electrolytic capacitors specifically, it is desirable to provide an anode having as great a surface area as possible so as to provide a maximum capacity for a given mass of anode material. Such anodes are conventionally formed of relatively expensive material, such as tantalum, niobium, and titanium, and, thus, the use of a minimum amount of the anode material results in the reduced cost of the capacitor.

In certain other devices, such as drilling devices, it is advantageous to use a collimated hole structure attached to drill shank wherein an abrasive slurry is pumped through the drill shank and the porous tip comprises a drill bit. The rotary or vibratory motion of the drill imparted to the abrasive slurry exuding therefrom generates the hole in a hard material. The bottom surface of a hole produced by this drill is very smooth due to use of the collimated hole passage tip that emits abrasive slurry from each passage. The bottom configuration of the hole can be formed of many geometrical shapes because the collimated hole structure tip can be fashioned into many shapes.

SUMMARY OF THE INVENTION

The present invention comprehends an improved passage structure providing for such effective maximizing of the surface area of the material mass by providing one or more extremely small cross section continuous bores in the body. The bores are substantially parallel, with generally equal cross sectional areas and dimensions. The structure surrounding the bores has a substantially continuous crystalline microstructure.

Thus, a principal feature of the present invention is the provision of a new and improved passage structure.

Another feature of the invention is the provision of such a passage structure comprising a member having at least one cylindrical through passage having a maximum cross section dimension under 2 microns and a length-to-maximum cross section dimension of at least 10.

A further feature of the invention is the provision of such a passage structure wherein the passages are spaced apart a distance less than 1 micron.

Still another feature of the invention is the provision of such a passage structure comprising a member having a plurality of substantially parallel, cylindrical unmachined through passages each having a maximum cross section dimension of under 10 mils and a length-to-maximum cross section ratio of at least approximately 10, the passages being arranged to occupy up to 90 percent of the cross sectional area of a portion of the member having at least three such passages therein, said passages being spaced apart less than 10 microns.

A yet further feature of the invention is the provision of such a passage structure wherein the passages have a coefficient of variation of cross sectional area along the length thereof and from passage to passage of under approximately 10 percent.

Another feature of the invention is the provision of such a passage structure comprising a member having a plurality of substantially parallel, cylindrical unmachined through passages formed by the steps of providing a plurality of elongated elements, disposing the elements in a parallel arrangement in a continuous body of matrix material to form a composite, constricting the composite of elements and matrix to reduce the cross sectional area of individual elements and matrix therein, the constricting of the composite includes at least one step of reduction such as wire drawing the composite and removing the elements therefrom.

Still another feature of the invention is the provision of such a passage structure wherein the maximum cross sectional dimension of the individual elements is reduced to under 10 mils.

Yet another feature of the invention is the provision of such a passage structure wherein the elements are disposed within tubes of the matrix material and the tube-enclosed elements are constricted to form the tubes into the continuous integrated matrix body with a monolithic structure.

A further feature of the invention is the provision of such a passage structure wherein the elements are formed of an acid-soluble material, the matrix material comprises an acid-insoluble material and the step of removing of the elements comprises a step of treating the constricted composite with a rod-solubilizing acid.

Still another feature of the invention is the provision of such passage structure wherein the elements are formed of a low melting point material, the matrix material comprises a high melting point material and the step of removing the elements comprises a step of heating the constricted composite above the melting point of the elements permitting the elements to flow out of the composite where the matrix becomes element free.

A yet further feature of the invention is the provision of such a passage structure comprising a member having a plurality of substantially parallel, cylindrical unmachined through passages formed by the steps of providing a plurality of elongated elements, disposing said elements in a parallel arrangement in a matrix material to form a composite, constricting the composite to reduce the cross sectional dimension of individual elements therein to under 10 mils, removing the elements, and cutting the remaining matrix body at pre-selected planes transverse to the axes of passages resulting from the removing of said elements.

A further feature of the invention is the provision of such a passage structure wherein the elements and the matrix are made of a wide variety of classes of compatible thermoplastic materials wherein one such class is metal.

Still another feature of the invention is the provision of such a passage structure comprising the anode means of an electrolytic capacitor.

A further feature of the invention is the provision of such an electrolytic capacitor including cathode means, an electrically conductive body defining anode means spaced from the cathode means, the body having a plurality of fine substantially cylindrical bores therethrough each having a cross section of under 5 mils, with the surface thereof comprising a dielectric film, and an electrically conductive medium extending between the cathode means and the film.

Another feature of the invention is the provision of such a capacitor wherein the bores are substantially hexagonal in cross section.

A still further feature of the invention is the provision of such a capacitor wherein the bores are substantially circular in cross section.

Yet another feature of the invention is the provision of such a capacitor wherein the body is formed of a metal and the dielectric film comprises an oxidized surface portion thereof.

Still another feature of the invention is the provision of such a passage structure comprising a drill bit tip of a drilling device.

A still further feature of the invention is the provision of such drill bit wherein an abrasive slurry is pumped through the drill bit.

Yet still another feature of the invention is the provision of such a drill bit tip wherein the bottom surface of the drilled hole is smooth.

Yet another feature of the invention is the provision of such a drill bit wherein the tip may have a variety of geometrical shapes.

BRIEF DESCRIPTION OF THE DRAWINGS

Other features and advantages of the invention will be apparent from the following description taken in connection with the accompanying drawing wherein:

FIG. 1 is a diametric section of a capacitor provided with an anode means defining a passage structure embodying the invention;

FIG. 2 is a transverse section thereof taken substantially along the line 2—2 of FIG. 1;

FIG. 3 is a schematic view illustrating a first step in the forming of the passage structure;

FIG. 3a is a transverse cross section of the assembly of FIG. 3;

FIG. 4 is a schematic view illustrating a subsequent constricting step in the forming of the passage structure;

FIG. 5 is a schematic view illustrating a further step in the forming of the passage structure;

FIG. 6 is a perspective view of a resultant passage structure embodying the invention;

FIG. 7 is a transverse section of a composite as resulting from the constriction step illustrated in FIG. 4;

FIG. 8 is a transverse section of the composite of FIG. 7 but with the outer can removed;

FIG. 9 is a transverse section illustrating a step of re-bundling of a plurality of can-removed composites of FIG. 8 in a further can as for subsequent reconstriction;

FIG. 10 is a perspective view of a modified form of passage structure as formed by employing the additional steps of FIGS. 7 through 9;

FIG. 11 is a schematic view illustrating a further step in forming an electrolytic capacitor anode from a passage structure formed by the methods disclosed herein;

FIG. 12 is a perspective view of a completed electrolytic capacitor anode embodying the invention;

FIG. 13 is a section view of a form of passage structure employed as a drilling device embodying the invention;

FIG. 14 is a section view of a modified form of drilling device;

FIG. 16 is a section view of a modified shape of drill tip; and

FIG. 17 is a section view of a modified shape of drill tip.

DESCRIPTION OF THE PREFERRED EMBODIMENTS

Figure 15:
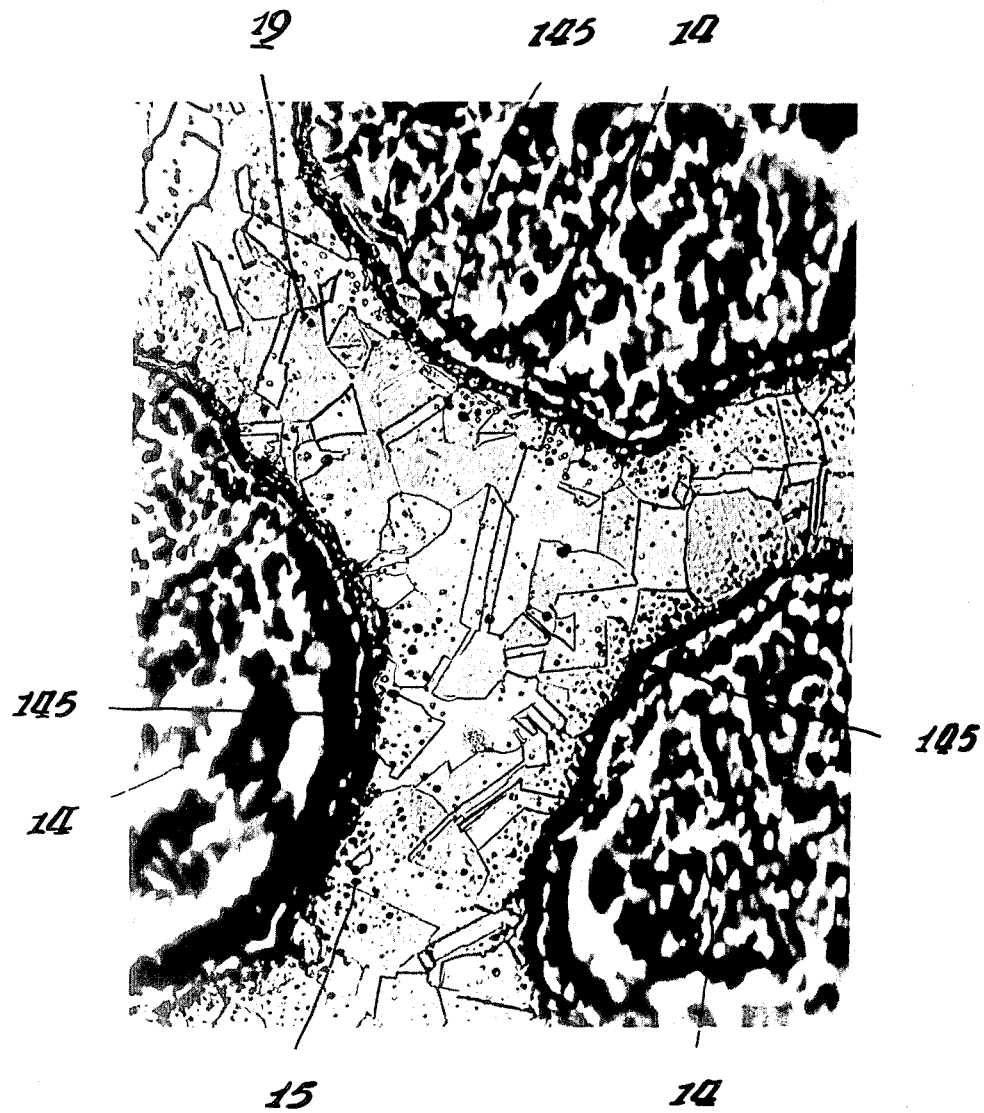
FIG. 15 is a photomicrograph showing portions of the tubular elements and the wires therein embodied in the structure of the invention before the wires are removed.

In the exemplary embodiment of the invention as disclosed in the drawing, a passage structure generally designated 10, as shown in FIG. 6 of the drawing, comprises a member having a plurality of through passages, or bores, 11 of extremely small cross section. In illustrating the invention, one use of the passage structure is shown in FIGS. 1 and 2 wherein a form 12 of the passage structure 10 is provided as an anode of an electrolytic capacitor 13. In an additional illustration of the invention shown in FIGS. 13, 14, 16 and 17, a passage structure 10 is used as a drill tip 210. While only two applications of the passage structure 10 are illustrated herein, it is to be understood that it is contemplated that the passage structure of the present invention may have efficacy in a large number of different applications in many different fields.

The passages 11 of structure 10 comprise through bores herein having a maximum cross section dimension of under 10 mils and a minimum cross section dimension of a fraction of a micron and with a bore length-to-maximum cross section dimension of over 10. It is contemplated within the scope of the invention that the passages 11 may be very closely spaced. In the illustrated embodiment, the passages 11 may even be spaced apart a distance much less than 1 micron.

The passage structure 10 within the scope of the invention may be provided with passages having a maximum cross section dimension of under 10 mils with the passages being arranged to occupy up to approximately 90 percent of the cross sectional area of a portion of the structure 10 having at least three substantially circular passages 11 therein, and with the passages being spaced apart less than 10 microns, such as when the passages are defined by parallel, close packed solid rods. The invention comprehends the provision of such a structure 10 wherein the coefficient of variation of cross section area along the length of each passage as well as from passage to passage is under approximately 10 percent (this corresponds to approximately 5 percent coefficient of variation of effective diameter as determined by the area of the equivalent circle).

The passage structure 10 herein is formed of constrictable material. Examples of suitable constrictable materials are thermoplastic materials, including metals and alloys such as stainless steel, tantalum, copper, lead, niobium, aluminum, nickel, titanium, tungsten, iron and carbon steel. The invention also contemplates other constrictable thermoplastic materials other than metals and alloys.

One configuration of passage structure 10 is preferably formed by a method illustrated in FIGS. 3a, 4, and 5. As shown in FIG. 3a, in a first step, a plurality of elongated elements, e.g. wires, 14 are encased in tubes 15 and inserted in a suitable tubular enclosure, or can, 16 to define a hexagonal array substantially filling the can. Spacers 15a may be provided as shown in FIG. 3a to fill a portion of the clearances between the hexagonallyarranged, sheathed wires and generally right cylindrical can 16. Thus, the resultant arrangement, or assembly, 17 defines a plurality of parallel, elongated elements 14 spaced apart by the material defining the tubes 15 which effectively comprise a matrix medium surrounding the individual elements 14. Illustratively, the elongated elements 14 may comprise wires or rods formed of metals such as nickel-copper alloys, and the tubes 15 may be formed of a suitable metal which may have the elements 14 separated therefrom as by mechanical, electrolytic, chemical, etc., separation. Herein the tubes 15 are formed of stainless steel and have pre-selected inside and outside diameters. Ninety-one such nickel-copper alloy wires 14 having a pre-selected diameter are inserted into the tubes 15 as shown in FIG. 3a. The can 16 may be formed of a suitable material which may ultimately be removed or allowed to remain as a surrounding element, as desired. The sheathed wires may be installed in the can 16 in any desirable array; although, as illustrated in FIG. 3a, the sheathed wires are oriented in a hexagonal array using spacers 15a. Alternate materials will work equally well as long as they are compatible materials. An example of such materials are wires formed of lead and tubes formed of copper.

The assembly 17 is then constricted by a suitable constricting means such as the device 18 (shown in FIG. 4) to reduce the diameter thereof. Correspondingly, the wires 14 are reduced in cross section and the tubes 15 have a reduced wall thickness. In such constriction, the spaces between the respective tubes are eliminated so that the tubes 15 form a substantially continuous monolithic matrix 165b surrounding the individual wires 14. The constricting process may comprise one or more size-reducing procedures such as rolling, drawing, extruding, swaging, forging, etc., or any combination thereof as desired. When the tubes 15 are made from certain materials, it is desirable to perform the constricting process with the tubes 15 and the wires 14 in an evacuated can 16.

When material such as stainless steel and nickel-copper alloys are used together, it has been found advantageous to heat the packed can assembly 17 to an elevated temperature to facilitate ease of constricting. However, the elevated temperature of the packed can assembly is well below the melting point of either material as well as below any temperature which would cause substantially elemental interdiffusion constituting alloying between the wires 14 and the tubes 15. Under certain conditions it has also been found advantageous to anneal the packed can assembly 17 between constricting operations. When materials are used that have low work hardening rates, such as lead and copper, it is a matter of choice depending upon the type and degree of the contricting operation, whether or not to heat the packed can assembly 17.

In an alternative method, the tubes 15 may firstly be constricted, as by drawing, about the wires 14 prior to their installation in the can 16 so as to facilitate packing in certain instances and achieve a desirable relationship between the overall diameter of the structure and the diameter of each passage.

In the illustration discussed above, the resultant constricted composite 17a includes 91 wires distributed in the matrix. For certain purposes, it may be desired to provide a larger number of wires which resultingly are drawn down to smaller diameter. Such increase in the number of wires and concomitant reduction in diameter may be readily affected by re-bundling and reconstricting the constricted composites 17a. The re-bundling and reconstricting process is illustrated in FIGS. 7 through 9. More specifically as shown in FIG. 7, in the composite 17a, the constricted wires 14 are distributed in spaced relationship in the substantially homogeneous monolithic continuous matrix 15b, with the composite (wire and matrix) structure being surrounded by the can 16. To permit a substantially homogeneous, continuous matrix arrangement in the re-bundled, reconstricted structure, the can 16 may be removed, if desired. Thus, in the illustrated embodiment where the wires 14 are formed of a nickel-copper alloy, the matrix 15b is formed of stainless steel, and when the can 16 is formed of mild steel, it is desirable to remove the mild steel can to permit the resultant re-bundled, reconstricted structure to have a substantially continuous all-stainless steel matrix. To this end, the constricted composite 17a is suitably treated to remove the can 16, e.g. where the can is formed of mild steel, the composite 17a may be treated with dilute nitric acid to remove the can without substantially affecting the remainder of the constricted composite structure 17a.

As illustrated in FIG. 8, the resultant canremoved composite 17b is generally hexagonal in external cross section. In re-bundling the composite structure 17b, the structure is firstly cut into suitable lengths such as 3 inch. A suitable number of such short lengths are then packed, as shown in FIG. 9, in a mild steel can 16a in a manner similar to the process illustrated in FIG. 3a. Illustratively, 91 of such 3 inch lengths of composite structure 17b may be packed in a mild steel can 16a again in a hexagonal array.

This packed array is then suitably constricted, e.g. as in the manner illustrated in FIG. 4, to provide a resultant re-constricted composite 17c having 8,281 wires (91 times 91 wires) in a substantially continuous, homogeneous monolithic matrix.

This process may be repeated as desired to further reduce the diameter of the wires and increase the number of wires in the resultant composite. Illustratively, by re-bundling and reconstricting 91 of the reconstricted composite 17c each having 8,281 wires and reducing the diameter thereof to 0.270 inches, the final composite 17c is a matrix 15b with 753,511 wires 14 therein each having a diameter of approximately 4 microns. As previously mentioned, heating the composite 17, 17a, or 17b to facilitate constricting or annealing the composite 17, 17a, or 17b after constricting or any combination thereof is a matter of choice.

Upon reduction of the composite (17a or 17c as the case may be) to the final desired size to define a final reduced-section composite, the filamentary elements 14 are suitably removed from the matrix material. As shown in FIG. 5, this is effected chemically in the illustrative embodiment by treatment of suitable lengths of the composite 17a (17c) with a suitable acid, such as nitric acid when the wires are formed of a nickel-copper alloy, in a suitable conventional treating apparatus 20. The dissolution of the elongated elements, or wires, 14 results in the formation of the passage structure 10 having extremely fine passages 11 corresponding to the small cross sections of the finally constricted wires 14 of composites 17a or 17c, as discussed above. The wire removing step further removes the can 16 (16a) where the can is formed of a material susceptible to the wire removing means (herein the nitric acid removes both the wires and the can concurrently). To facilitate the removal of the material of which the elongated elements 14 are formed, the reduced composite 17a (17c) may be firstly cut into pre-selected short lengths. Alternatively, the structure 10 may be cut to any desired length from a relatively long composite 17a (17c) subsequent to the removal of the wires 14 and can 16.

When material such as lead and copper are used for the wires 14 and the tubes 15, respectively, the constricted lead wires may be removed from the composite 17a (17b) by heating the composite above the melting point of lead and inducing the liquid lead to flow out of the composite. The constricted and elongated wire elements 14 melting out of the composite 17a (17c) also result in the formation of the passage structure 10 having extremely fine passages 11 that are the same size as the wire 14 in the composites 17a or 17c. The can 16 (16') may be removed by any conventional method such as discussed above, if desired.

EXAMPLE 1

In accordance with the invention one specific example of the passage structure has approximately 5,600 passages each having a mean cross sectional dimension of 5 mils (0.005 inches) and a passage wall thickness of approximately 2 mils. A 304 stainless steel can having an inside diameter of approximately 2.840 inches is packed with 5,600 type 304 stainless steel tubes with nickel-copper alloy wires placed therein. The diameter of the stainless steel tubes is 0.035 inches and the diameter of the wire is approximately 0.025 inches. The packed can suitably evacuated and sealed is heated to about 1850° F. and held at heat for a sufficient time to permit equilibrium. The heated packed can is extruded to an outside dimension of 0.650 inches wherein both the wires and the tubes are constricted reducing the cross sectional area thereof and elongating the can and the contents thereof. The elongated constricted composite is then drawn to a final diameter of 0.625 inches. The composite bar is then sliced into wafers having a thickness of approximately 1/16th inch (providing an aspect ratio of 12.4). The wafer is then subjected to a bath of nitric acid removing the nickel-copper alloy wires leaving a continuously monolithic homogeneous stainless steel passage structure.

EXAMPLE 2

Another passage structure with 5,600 2 mil passages may be made by further constricting the extruded composite of Example 1 and reducing the outside diameter to 0.250 inches. The composite is sliced into wafers approximately ⅛ inch thick. The wafers are then subjected to a bath of nitric acid to remove the nickel-copper alloy wires leaving a continuous monolithic stainless steel passage structure having an aspect ratio of 60:1.

EXAMPLE 3

Another passage structure that is made in accordance with this invention is a passage structure with approximately 335,600 passages, each passage having a mean cross sectional diameter of 12 microns (0.0005 inches) and a passage wall thickness of approximately 5 microns. A stainless steel can having an inside diameter of approximately 2.840 inches is packed with 5,600 type 304 stainless steel tubes with nickel-copper alloy wires placed therein. The diameter of the stainless steel tube is about 0.035 inches and the diameter of the wire is approximately 0.025 inches. The packed can suitably evacuated and sealed is heated to about 1,850° F and held at heat for a sufficient length of time to achieve equilibrium. The heated packed can is extruded to an outside diameter of 0.650 inches. The packed can is progressively drawn down to 0.204 inches diameter with several annealing steps between the several drawing passes. The composite rods are cut into approximately 6 inch lengths and 61 such composite rods are re-bundled or re-packed into another stainless steel can having a 1.870 inch inside diameter. Type 304 stainless steel shim stock, 0.750 inches wide by 0.015 inches thick is placed in the can to arrange the packed composite in a hexagonal array similar to FIG. 9. The composite packed can suitably evacuated and sealed is heated to about 1,850 degrees F and held at temperature a sufficient length of time to achieve equilibrium. The new composite can is extruded to a diameter of about 0.650 inches. The composite can is subsequently constricted to a final outside diameter of 0.625 inches for accurate sizing and shaping. Wafers approximately 0.020 inches thick are sliced from the composite bar (providing an aspect ratio of 40:1). These wafers are then placed in a bath of nitric acid which removes the nickel-copper alloy wires leaving a continuously monolithic homogeneous stainless steel passage structure. Thus, the passage structure so formed has 335,600 passages, each having a mean cross sectional diameter of 12 microns and a passage wall thickness of approximately 5 microns.

Illustratively, another embodiment of the passage structure is formed by further constricting the 0.650 inch diameter composite of Example 3 wherein a final composite diameter of 0.100 inch may be achieved. By slicing the composite to form wafers 0.005 inch thick and removing the filaments therefrom as discussed above, a final passage structure of 335,600 passages having a sectional dimension of approximately 1.9 microns with passage wall thickness of approximately 0.87 microns is formed. The aspect ratio of the wafer is approximately 65:1.

It has been found that when the passage structure is formed with different combinations of compatible materials that the constricting operations may vary as to type and as well as the number of constricting operations. The structure may be formed either with or without initial and/or intermediate heat treatment steps. The maximum number of passages in any one structure is determined by the initial number of tube-rod combinations placed in the first can and the number of re-bundling and reconstricting operations performed thereafter.

It will be appreciated that when the diameter of the wire in the tube is decreased by constriction that the length of the wire is drastically elongated. And accordingly, when the diameter of an element is decreased, the outside surface area thereof is increased. Thus, as the outside diameter of the tubes are reduced, correspondingly, the wall thickness of the tubes are also decreased in thickness with the outside surface area of the tubes being increased. During the constricting operation or operations, as the case may be, the increased surface area of one tube mates surface-to-surface with the adjacent tubes. The close association of the tube surfaces during the constricting operation and the greatly increased surface area thereof facilitates atom migration between the tube surfaces, as the tubes are constricted and deformed. Initially, each tube has its own metallographic crystalline structure. However, the atom migration across surfaces results in a common indistinguishable crystalline structure creating a monolithic structure. This new microstructure is a monolithic homogeneous crystalline structure as shown in FIG. 15. The photomicrograph in FIG. 15 was taken at approximately 750 × magnification showing the passage wall 19 structure of the tubes 15 and the wires 14 after constriction. The passage wall 19 is formed by two or more tubes 15 which become integrated by the interdiffusion of atoms of one tube into the surface of the other. After constricting there are effectively no tube boundaries where the original surfaces were located as can be seen in FIG. 15. The photomicrograph shows that the passage wall 19 is one integrated continuous homogeneous monolithic crystalline matrix with no original tube boundaries therein. The area 145 in FIG. 15 is the interface between the wire 14 and the passage wall 19. During constricting, it has been found that trace amounts of wire 14 material may remain embedded in the matrix after removing the wire 14. The surfaces of adjacent tubes 15 have become so interdiffused that one structure is created from two parts wherein as a consequence there is an integrated continuous unified matrix formed which has structural integrity.

It is contemplated as within the scope of the invention that all thermoplastic materials can be used to make the monolithic structure as long as a compatible associated material is selected, and that the heating step or steps (if heating is desired) and the constricting step or steps are appropriate for the materials selected.

In no instance, when heat treatment or hot working is employed, is any material heated to the melting point thereof during the formation of the monolithic matrix. However, as discussed above, heat may be used to remove the fully constricted wires. Heat is preferably used in pre-selected material combinations where the particular flow characteristics of the individual materials preclude protracted cold working. Conversely, there are many other material combinations where the flow characteristics permit extensive cold reduction. One of these such combinations, as mentioned heretofore, is a copperlead arrangement wherein the lead wires are sheathed in copper tubes. For the purpose of illustration, the packed copper tubes 15 can be placed in a copper can. All constricting operations are performed cold (as opposed to hot working for stainless steel) with the resultant copper matrix formed being a homogeneous monolithic structure. The compact is sliced into any desired length such as 3½ inches. The lead wires are removed by heating as described hereinabove with the resulting passage structure having passages approximately 6 mils effective diameter and an aspect ratio of approximately 580:1.

As discussed briefly above, the passage structure 10 (10') may be utilized as desired, i.e., in any suitable application where a passage structure having extremely fine through cylindrical bores is a desideratum. One such application, as discussed above, is as a new and improved structure for use in an electrolytic capacitor 13, as shown in FIGS. 1 and 2. For such use, the exposed surfaces of the passage structure 10 (10') are firstly treated to define a dielectric coating or film 21. Such dielectric film may comprise an oxide coating produced on the passage structure by means of a suitable conventional electrolysis apparatus 22. Illustratively, the resultant anode structure 12 may comprise such a structure formed of a suitable film forming material such as niobium, tantalum, aluminum, titanium, hafnium, vanadium, zirconium, and the like.

The dielectric coated anode structure 12 is installed coaxially in a cup-shaped cathode 23 having a cathodic electrical connection 24. The passages 11 and the space 25 within cathode 23 surrounding the anode 12 are filled with a suitable electrolyte E to provide an electrically conductive bridge from the cathode 23 to the dielectric film 21. Illustratively, the electrolyte may comprise a wet electrolyte such as sulphuric acid or a dry electrolyte such as manganese dioxide produced by thermal decomposition of manganese nitrate subsequent to the filling of passages 11 of anode 12 by the manganese nitrate. The open end of the cathode 23 may be closed by a suitable electrically insulating cap 26 having an anodic electrical connection 27 extended therethrough to have electrical connection to the anode 12.

By virtue of the improved method of forming anode 12 as discussed above, accurate control over the capacitance of the capacitor is obtained. The anode may be formed at relatively high forming voltages. The resultant high capacitance obtained by the maximized surface provision of the anode 12 for the small volume and weight of the anode and the high voltage characteristic thereof result in a highly improved, low cost, electrolytic capacitor 13. The improved capacitor forming characteristics of the anode structure 12 where formed of tantalum are illustrated in the following Table I and II.

TABLE I

Variation of Capacitance-Voltage/Volume in Columnar-Hole Tantalum Anodes with Hole Shape, Size, and Spacing

| CROSS SECTION SHAPE | CROSS SECTION AREA (circular mils) | EDGE-EDGE SPACING (mils) | CAPACITANCE-VOLTAGE/VOLUME (mf-v/in.$^3$) |
|---|---|---|---|
| Circular | 0.25 | 0.1 | 400 |
| Circular | 0.16 | 0.1 | 460 |
| Circular | 0.25 | 0.05 | 480 |
| Circular | 0.16 | 0.05 | 570 |
| Hexagonal | 0.25 | 0.1 | 460 |
| Hexagonal | 0.16 | 0.1 | 530 |
| Hexagonal | 0.25 | 0.05 | 550 |
| Hexagonal | 0.16 | 0.05 | 650 |

TABLE II

Variation of Capacitance-Voltage/Weight in Columnar-Hole Tantalum Anodes with Hole Shape, Size, and Spacing

| CROSS SECTION SHAPE | CROSS SECTION AREA (circular mils) | EDGE-EDGE SPACING (mils) | CAPACITANCE-VOLTAGE/WEIGHT (mf-v/g) |
|---|---|---|---|
| Circular | 0.25 | 0.1 | 4.0 |
| Circular | 0.16 | 0.1 | 4.1 |
| Circular | 0.25 | 0.05 | 6.9 |
| Circular | 0.16 | 0.05 | 7.3 |
| Hexagonal | 0.25 | 0.1 | 5.3 |
| Hexagonal | 0.16 | 0.1 | 5.2 |
| Hexagonal | 0.25 | 0.05 | 11.2 |
| Hexagonal | 0.16 | 0.05 | 11.0 |

As the anode structure 12 may be formed of any suitable dielectric film forming metal, as well as tantalum, relatively low cost metals such as aluminum may be utilized so as to effectively minimize the material cost and, therefore, the construction cost of the capacitor while yet providing the desirable advantages discussed above.

Another application of the collimated hole structure, as discussed above, is a new and improved hole drilling device. The front portion of the drill 201 has a passage structure drilling tip 210 with a plurality of bores 11 as shown in FIG. 13. The passage tip 210, a thick wafer fashioned from the passage structure 10, is secured to a drill shank 202. The drill shank 202 has a passage 203 opening into a cone shaped cavity 204 located in the end of the shank and being slightly smaller than the shank 202 with the drilling tip 210 attached thereto. A slurry of abrasive, such as silicon carbide laden oil, is forced through the hole 203 in the shank 202 into the drilling tip 210. The shank 202 and tip 210 are rotated by any suitable means and brought into contact with the object 205, being drilled. The abrasive slurry is emitted through the passages 11 in the end of the tip 210 abrading the hole 206 in the object 205. The combined effect of rotation and pumped slurry generate a hole 206 in the object 205. The shank 202 and the tip 210 are made from relatively soft metal such as stainless steel and the object 205 being drilled is made from much harder material such as a ceramic. The abrasive laden slurry may be accurately and controllably directed toward the hard material enabling the drill 201 to form a hole to close tolerances. As the drill 201 penetrates deeper into the material 205 being drilled an overcut 207 occurs permitting the pressurized slurry to escape. The overcut 207 can be very accurately controlled and therefore adequate allowance can be made when selecting the diameter of the drill tip 210 to compensate for the overcut 207. By selecting a relatively soft material for the shank 202 and tip 210, the slurry with the hard abrasive minimizes the deleterious effect on the drill 201.

Rather than by rotation, the drill 201 may be actuated by vibration. The drill 201 may be vibrated by a number of conventional vibratory sources. However, when the drill 201 is vibrated the shank 202 has the shape of a logarithmic horn 201' as shown in FIG. 14.

Besides being able to drill hard materials, the drill tip 210 may be shaped to any pre-selected point such as those shown in FIGS. 16 and 17. In FIG. 16 the tip 210 has a hemispherical point 208 enabling the drill to produce a pre-determined concave point 209. In FIG. 17 the tip 210 has a partial reverse cone point 212 enabling the drill to produce a hole with cone-shaped protrusion 213 therein. Thus, the tip 210 may be shaped as desired. It is fully contemplated that other slurry laden abrasives may be substituted for the oil-silicon carbide combination when desired.

The number of passages 11 and the spacing therebetween in the tip 210 substantially determines the smoothness and flatness of the bottom surface of the drilled hole. The more passages 11 in the tip 210 and the closer the spacing thereof the smoother and flatter the hole 206 (209 and 213). The fewer the passages 11 and the greater the spacing therebetween the rougher the surface of the hole. By using the collimated hole structure 10 wherein a large number of passages 11 may be provided over the whole area of the drilling tip 210, a very smooth surface hole bottom may be achieved.

The drilling device when vibratorily driven can make any geometrically shaped hole by pre-selecting the shaping of the tip 210. Thus, by using a modified embodiment of this invention it is possible to make holes having bottom geometric shapes such as, squares, triangles, pentagons, etc.

While we have shown and described certain embodiments of our invention, it is to be understood that it is capable of many modifications. Changes, therefore, in the contruction and arrangement may be made without departing from the spirit and scope of the invention as defined in the appended claims.

We claim:

1. A method of making a passage structure having a plurality of substantially parallel unmachined through passages comprising the steps of:
   1. providing a plurality of sacrificial elongated metal elements each surrounded by a metal tube, the metal of the elements differing from that of the tubes thereby forming a plurality of composite elements;
   2. tightly packing the composite elements in a substantially parallel arrangement;
   3. reducing the arrangement
      i. to consolidate it into a substantially void free body, and
      ii. to subsequently further reduce the body to integrate by solid state diffusion the adjacent tubes into a monolithic metallurgical matrix with a homogenous microstructure and concomitantly substantially diminish the cross section of the elements and the thus formed matrix between the elements;
   4. cutting the body into preselected lengths; and
   5. removing the sacrificial elements from the tubes to define a plurality of unmachined passages.

2. The method of claim 1 wherein the arrangement is heated prior to constriction.

3. The method of claim 1 wherein the cross-sectional dimension of the constricted individual elements is under 10 mils.

4. The method of claim 1 wherein the arrangement is surrounded by an outer enclosure.

5. The method of claim 1 wherein the arrangement is heated during constriction.

6. A method of making a passage structure having a plurality of substantially parallel unmachined through passages comprising the steps of:
   1. providing a plurality of sacrificial elongated metal elements each surrounded by a metal tube, the metal of the elements differing from that of the tubes thereby forming a plurality of composite elements;
   2. tightly packing the composite elements in a parallel arrangement inside a container, the packing arranged to achieve a maximum packing density;
   3. evacuating the container;
   4. sealing the evacuated container;
   5. constricting the evacuated container to
      i. form a void free body eliminating any interstices between the tubes and within the composite elements,
      ii. reduce the body in cross section to integrate the tubes into a monolithic matrix by solid state diffusion, and
      iii. mechanically reduce the cross section of the integrated matrix and the cross section of the elements to a smaller size;
   6. cutting the reduced body to pre-selected lengths; and
   7. removing the sacrificial elements from the cut portions to define a plurality of unmachined passages.

7. The method of claim 6 wherein the arrangement is heated prior to constriction.

8. The method of claim 6 wherein the arrangement is heated during constricting.

9. A method of making a passage structure having a plurality of substantially parallel unmachined through passages comprising the steps of:

1. providing a plurality of sacrificial elongated metal elements each surrounded by a metal tube, the metal of the elements differing from that of the tubes thereby forming a plurality of composite elements;
2. tightly packing the composite elements in a parallel arrangement;
3. reducing the arrangement
   i. to consolidate it into a substantially void free body, and
   ii. to substantially further reduce the body to integrate by solid state diffusion the adjacent tubes into a monolithic metallurgical matrix with a homogenous microstructure and concomitantly diminish the cross section of the elements and the thus formed matrix between the elements;
4. cutting the arrangement into elongated sections having external walls;
5. tightly packing the sections in a substantially parallel manner to form a composite arrangement;
6. reducing the tightly packed composite arrangement
   i. to consolidate it into a substantially void free body, and
   ii. to substantially further reduce the body to integrate by solid state diffusion the adjacent walls into a monolithic metallurgical matrix with a homogenous microstructure and concomitantly substantially diminish the cross section of the elements and the thus formed matrix between sections;
7. cutting the body into pre-selected lengths; and
8. removing the elements from said constricted body to define holes therein.

10. The method of claim 9 wherein the composite arrangement is surrounded by an outer enclosure.

11. The method of claim 10 wherein said outer enclosure is removed after integration.

12. The method of claim 9 wherein said arrangement is heated prior to constricting.

13. The method of claim 9 wherein said composite arrangement is heated prior to constricting.

14. A method of making passage structures having substantially parallel unmachined through passages comprising the steps of:

1. providing a plurality of sacrificial elongated metal elements each surrounded by a metal tube, the metal of the elements differing from that of the tubes, to form a plurality of composite elements,
2. tightly packing the composite elements in a parallel manner inside a first enclosure, the packing arranged to achieve a maximum packing density and the enclosure made from the same metal as the tubes;
3. evacuating the first enclosure;
4. sealing the evacuated first enclosure;
5. heating the sealed evacuated first enclosure and its contents;
6. reducing the sealed evacuated enclosure to
   i. form a void free arrangement eliminating any interstices between the tubes,
   ii. reduce the arrangement in cross section to integrate the tubes into a monolithic first matrix by solid state diffusion, and
   iii. mechanically reduce the cross section of the integrated matrix and the cross section of the elements to a substantially smaller size;
7. cutting the constricted arrangement into elongated sections of a preselected length;
8. tightly packing the sections in a parallel manner inside a second enclosure, the second enclosure made from the same metal as the first enclosure and the tubes;
9. heating the second enclosure and its contents;
10. reducing the second enclosure to
    i. form a void free second arrangement eliminating any interstices between the elongated sections,
    ii. reduce the second arrangement in cross section to integrate the sections and the second enclosure into a monolithic second matrix by solid state diffusion, and
    iii. mechanically reduce the cross section of the integrated first and second matrixes and the cross section of the elements to substantially smaller size thus forming a matrix unit;
11. cutting the matrix unit into preselected lengths; and
12. removing the sacrificial elements thus providing the desired passage structure.

* * * * *